(12) United States Patent
Lee et al.

(10) Patent No.: US 11,070,427 B2
(45) Date of Patent: Jul. 20, 2021

(54) METHOD AND APPARATUS FOR TRANSMISSION OVER VIRTUAL TUNNEL

(71) Applicant: Advanced Semiconductor Engineering, Inc., Kaohsiung (TW)

(72) Inventors: Jian Feng Lee, Kaohsiung (TW); Yu-Jung Chang, Kaohsiung (TW)

(73) Assignee: ADVANCED SEMICONDUCTOR ENGINEERING, INC., Kaohsiung (TW)

(*) Notice: Subject to any disclaimer, the term of this patent is extended or adjusted under 35 U.S.C. 154(b) by 63 days.

(21) Appl. No.: 15/858,954

(22) Filed: Dec. 29, 2017

(65) Prior Publication Data

US 2018/0205601 A1    Jul. 19, 2018

Related U.S. Application Data

(60) Provisional application No. 62/447,268, filed on Jan. 17, 2017.

(51) Int. Cl.
| | | |
|---|---|---|
| *G06F 15/16* | (2006.01) | |
| *H04L 12/24* | (2006.01) | |
| *G06F 8/65* | (2018.01) | |
| *H04L 29/08* | (2006.01) | |
| *H04W 8/24* | (2009.01) | |
| *G06F 8/654* | (2018.01) | |

(52) U.S. Cl.
CPC .............. *H04L 41/082* (2013.01); *G06F 8/65* (2013.01); *G06F 8/654* (2018.02); *H04L 41/0233* (2013.01); *H04L 67/125* (2013.01); *H04L 67/34* (2013.01); *H04W 8/245* (2013.01); *H04L 41/0213* (2013.01)

(58) Field of Classification Search
CPC ....... G06F 8/65; G06F 8/654; H04L 41/0213; H04L 41/0233; H04L 41/082; H04L 67/125; H04L 67/34; H04W 8/245
See application file for complete search history.

(56) References Cited

U.S. PATENT DOCUMENTS

| | | | |
|---|---|---|---|
| 8,296,268 B2 | 10/2012 | Ingles et al. | |
| 8,726,259 B2 | 5/2014 | Juneja | |
| 8,843,078 B2 | 9/2014 | Wang et al. | |
| 8,910,139 B2 | 12/2014 | Li et al. | |
| 2011/0191764 A1* | 8/2011 | Piorecki | G06F 8/65 717/172 |
| 2012/0046022 A1* | 2/2012 | Kalke | H04M 3/42178 455/419 |
| 2013/0111455 A1* | 5/2013 | Li | G06F 21/572 717/169 |
| 2014/0366012 A1 | 12/2014 | Jamadagni et al. | |

* cited by examiner

*Primary Examiner* — Normin Abedin
(74) *Attorney, Agent, or Firm* — Foley & Lardner LLP (57) ABSTRACT

An electronic device for updating firmware in a target device over the air includes a dispatching module and a firmware over the air (FOTA) core. The dispatching module is configured to establish a communication link between the electronic device and the target device. The FOTA core is configured to receive information corresponding to updated firmware via the established communication link.

13 Claims, 9 Drawing Sheets

METHOD AND APPARATUS FOR TRANSMISSION OVER VIRTUAL TUNNEL

CROSS-REFERENCE TO RELATED APPLICATIONS

This application claims the benefit of and priority to U.S. Provisional Application No. 62/447,268, filed Jan. 17, 2017, the content of which is incorporated herein by reference in its entirety.

BACKGROUND

1. Technical Field

The present disclosure relates to a method and an apparatus for transmission over a virtual tunnel, and more particularly, to a method and an apparatus that provide for firmware over-the-air (FOTA), a software component management object (SCOMO) and/or a lock and wipe management object (LAWMO) over a virtual tunnel.

2. Description of the Related Art

Updating firmware or software for an electronic device is challenging once the electronic device has been shipped or deployed. Upgrading firmware (e.g. via FOTA) or software (e.g. via a SCOMO) can provide for bug fixes within the software and for new functionality after the electronic device has passed into the hands of consumers.

Firmware is a computer program that is embedded in an electronic device. In practical terms, firmware upgrades can improve the performance and reliability and even modify available functionality of an electronic device, and firmware updates can ensure the operation of hardware is kept current and compatible.

Generally, firmware or software upgrades or updates refer to the process of allowing software embedded in an electronic device to be updated (e.g. wirelessly). For example, FOTA allows the creation of firmware updates that are compressed and transmitted over-the-air to an electronic device, and then decompressed and applied to the device.

SUMMARY

In some embodiments, an electronic device for updating firmware in a target device over-the-air is provided. The electronic device includes a dispatching module and a firmware over-the-air (FOTA) core. The dispatching module is configured to establish a communication link between the electronic device and the target device. The FOTA core is configured to receive information corresponding to updated firmware via the established communication link.

In some embodiments, a FOTA system includes a first dispatching module and a FOTA module. The first dispatching module is configured to establish a communication link between the first dispatching module and a server. The FOTA module includes a second dispatching module and a FOTA core. The second dispatching module is configured to establish a communication link between the first dispatching module and the second dispatching module. The FOTA core is configured to receive information corresponding to a firmware.

In some embodiments, a method for updating FOTA includes (a) establishing a communication link between a FOTA module and a device; (b) connecting the FOTA module with the device through a hardware interface; and (c) receiving, by the FOTA module, information corresponding to a firmware by the established communication link.

BRIEF DESCRIPTION OF THE DRAWINGS

Aspects of some embodiments of the present disclosure are readily understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
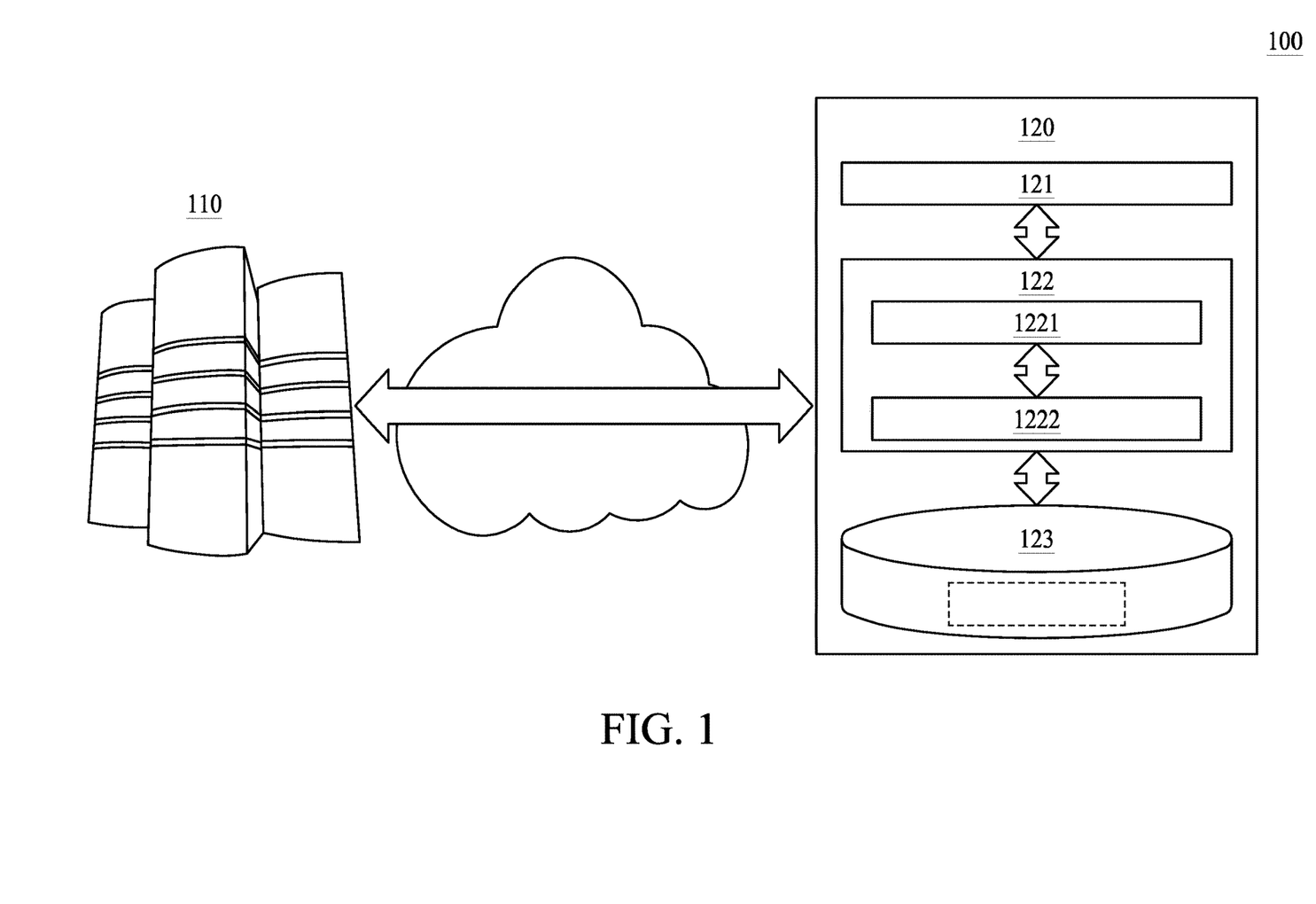
FIG. 1 illustrates a comparative system for updating a firmware in a target device.

FIG. 1 illustrates a comparative system 100 for updating firmware in a target device 120. The target device 120 may be a smart phone, a tablet PC, an Internet of Things (IoT) device or other electronic device. The target device 120 communicates wirelessly with a server 110 (e.g., a FOTA server) via a transmission network over an air medium. The target device 120 includes a wireless communication module 121, which may be a WiFi module, a 3 G module, a 4 G long term evolution (LTE) module, a ZigBee module, a Bluetooth module, or other communication module. The target device 120 includes a FOTA Core 122. The FOTA Core 122 is software or an application configured to perform an upgrade of firmware in the target device 120, which is stored in a flash memory 123 or other non-volatile memory. The FOTA Core 122 includes a FOTA Client 1221 and an Update Agent 1222. The FOTA Client 1221 is configured to download the updated firmware from the server 110 following a communication protocol, such as, for example, an Open Mobile Alliance (OMA) protocol. The Update Agent 1222 is configured to execute the upgrade of the firmware in the target device 120, using hardware resources of the target device.

In order to allow upgrading FOTA in the system 100, the FOTA Core 122 is developed and integrated into a target device 120. Since the FOTA Core 122 is relatively complicated, it can be a considerable burden to integrate the FOTA Core 122 into the target device 120. The target device 120 can be operated in different operating systems, which may include WINDOWS, ANDROID, LINUX, MAC, and so forth, and can have different hardware specifications, and integration of the FOTA Core 122 can involve recompilation and redesign of the FOTA Core 122 for different operating systems and different hardware specifications. Thus, upgrading FOTA in the system 100 involves low efficiency and high overhead for system integration.

Moreover, the FOTA upgrade in the system 100 is constrained by existing hardware resources of the target device 120. The target device 120 may not have enough hardware resources (e.g., constrained power and operating speed of a processor and constrained memory capacity of RAM and flash memory) to perform a FOTA operation. As a result, the functionality of the target device 120 may not be extended or a software bug may not be corrected by upgrading firmware without a wired connection.

Figure 2:
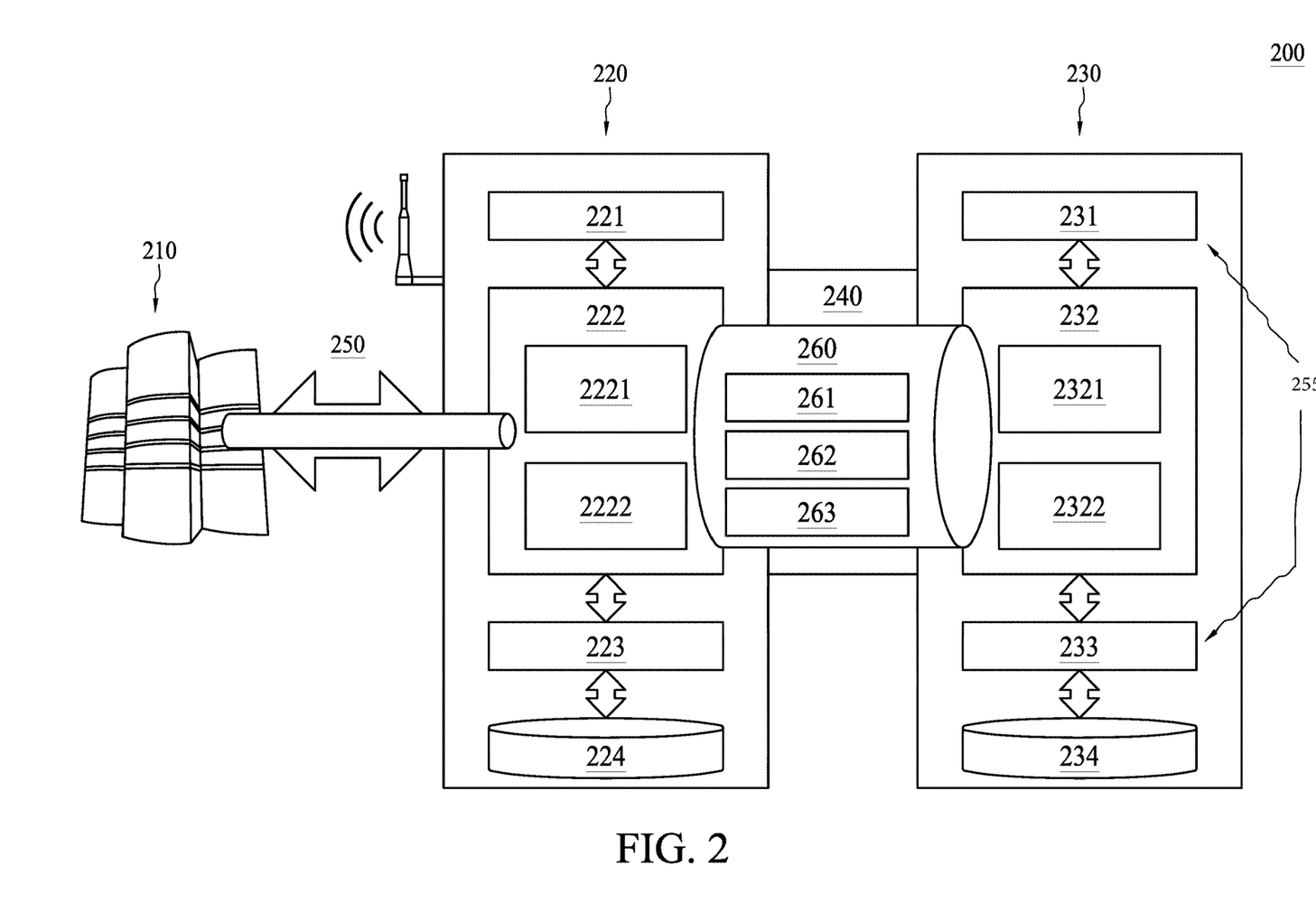
FIG. 2 illustrates a FOTA system in accordance with some embodiments of the present disclosure.

FIG. 2 illustrates a FOTA system 200 in accordance with some embodiments of the present disclosure. The FOTA system 200 includes a server 210 (e.g., a FOTA server), a target device 220 and a FOTA hardware module 230.

In some embodiments, the target device 220 may be a smart phone, a tablet PC, an IoT device or other electronic device. The target device 220 includes a Dispatcher (also referred to herein as a "Dispatching Module") 222 corresponding to a Dispatcher 232 in the FOTA hardware module 230. The target device 220 may include an Update Agent (also referred to herein as an "Update Module") 223 corresponding to an Update Agent 233 of the FOTA hardware module 230, and may retrieve information from a memory 224 of the target device for performing an update operation. The Update Agent 223 and/or the Update Agent 233 can be configured to generate updated firmware based on information corresponding to the updated firmware, and/or to transmit the updated firmware. The target device 220 communicates wirelessly with the server 210 via a transmission network over an air medium. The target device 220 includes a wireless communication module 221 (or a connectivity module), which may be a WiFi module, a 3 G module, a 4 G LTE module, a ZigBee module, a Bluetooth module, or other communication module. In some embodiments, the wireless communication module 221 can be replaced by a wired communication module (e.g., Ethernet or cable). The target device 220 may include the memory 224 (e.g., a flash memory) which can store the Dispatcher 222.

The FOTA hardware module 230 includes a FOTA Client 231, the Dispatcher 232, the Update Agent 233 and a memory 234. The FOTA Client 231 is configured to download the updated firmware from the server 210 following, for example, an OMA protocol. The Update Agent 233 is configured to execute the upgrade of the firmware in the target device 220. The memory 234 is configured to store the Dispatcher 232, which includes a Link Manager 2321 and an Interface Abstraction Layer 2322, and a FOTA Core 255, which includes the FOTA Client 231 and the Update Agent 233. In some embodiments, the Dispatcher 232 of the FOTA hardware module 230 may include a private key while the Dispatcher 222 of the target device 220 may include a public key. A communication link between the Dispatcher 232 of the FOTA hardware module 230 and the Dispatcher 222 of the target device 220 can be established if the public key and the private key are matched.

In some embodiments, the FOTA hardware module 230 may be an electronic component (e.g., an integrated circuit (IC)) separated from the target device 220. Alternatively, the FOTA hardware module 230 may be an electronic component (e.g., an IC) integrated into the target device 220 and can have access to its own hardware resources separated from hardware resources of the target device 220. The FOTA hardware module 230 may communicate with the target device 220 by a hardware interface 240 (e.g., a universal serial bus (USB), a universal asynchronous receiver-transmitter (UART), inter-integrated circuit (I²C) bus, and so forth). This avoids complicated software development and streamlines system integration on the target device 220. Communicated data for a FOTA operation can be transmitted over the hardware interface 240 between the target device 220 and the FOTA hardware module 230, using paired Dispatchers in the target device 220 and the FOTA hardware module 230 (e.g. Dispatchers 222 and 232).

A communication link between the server 210 and the FOTA hardware module 230 includes a virtual tunnel 260 to allow upgrading FOTA. For example, the communication link between the server 210 and the FOTA hardware module 230 includes a communication link 250 between the server 210 and the target device 220, and is created by using at least a wireless interface of the wireless communication module 221 of the target device 220, the hardware interface 240 between the target device 220 and the FOTA hardware module 230 and the virtual tunnel 260 between the target device 220 and the FOTA hardware module 230. The virtual tunnel 260 is created by the Dispatcher 222 in the target device 220 and the Dispatcher 232 in the FOTA hardware module 230. The virtual tunnel 260 may be created responsive to the target device 220 and/or the FOTA hardware module 230 matching the above-mentioned public key and the private key.

In some embodiments, the virtual tunnel 260 can be readily created by integrating one or more of a communication protocol 261, a security protocol 262, and an encryption/decryption protocol 263) (e.g. instead of integrating a FOTA Core 255 into the target device). The Dispatcher 222 in the target device 220 and the Dispatcher 232 in the FOTA hardware module 230 respectively include a Link Manager 2221, 2321 and an Interface Abstraction Layer 2222, 2322. Functions of the Link Managers 2221, 2321 and the Interface Abstraction Layers 2222, 2322 (e.g. for application program interface (API) integration) are further explained below. The FOTA hardware module 230 uses the virtual tunnel 260, which leverages the connectivity function of the target device 220 to perform authentication with the server 210 for upgrading FOTA. The FOTA operation can be performed by using a FOTA Core 255 in the FOTA hardware module 230. By utilizing the virtual tunnel 260, communication between the FOTA Core and the server 210 can be improved.

The FOTA hardware module 230 uses the connectivity function of the target device 220 to establish connection and perform authentication with the server 210. The FOTA hardware module 230 uses the virtual tunnel 260 to establish a connection with the server 210 over a wireless interface and a hardware interface 240, and may thus omit additional connections or additional resources. Once the connection is established, the FOTA hardware module 230 can perform the FOTA operation for the target device 220. In some embodiments, communication over the virtual tunnel 260 can be established using one or more of the following: 1) the communication protocol 261 (which can include, e.g., protocol conversion, packet redirection, and data compression); 2) the security protocol 262 (which can include, e.g., a handshake protocol, flow control, and a command-line interface); and 3) the encryption/decryption protocol 263 (e.g., Advanced Encryption Standard (AES) encryption/decryption).

As previously noted, each of the Dispatcher 222 in the target device 220 and the Dispatcher 232 in the FOTA hardware module 230 includes a Link Manager 2221 or 2321 and an Interface Abstraction Layer 2222 or 2322. The Link Managers 2221, 2321 establish the virtual tunnel 260, and also implement the communication protocol 261, the security protocol 262 and the encryption/decryption protocol 263 for data transmission of a FOTA operation. The Link Managers 2221, 2321 also handle communication, negotiation and transformation between different interfaces (e.g., a wireless interface and a hardware interface within the Interface Abstraction Layer). The Interface Abstraction Layers 2222, 2322 operate to reduce the complexity of communication between varying hardware interfaces and the Link Managers 2221, 2321, and provide a standard API to the Link Manager 2221, 2321.

Figure 3:
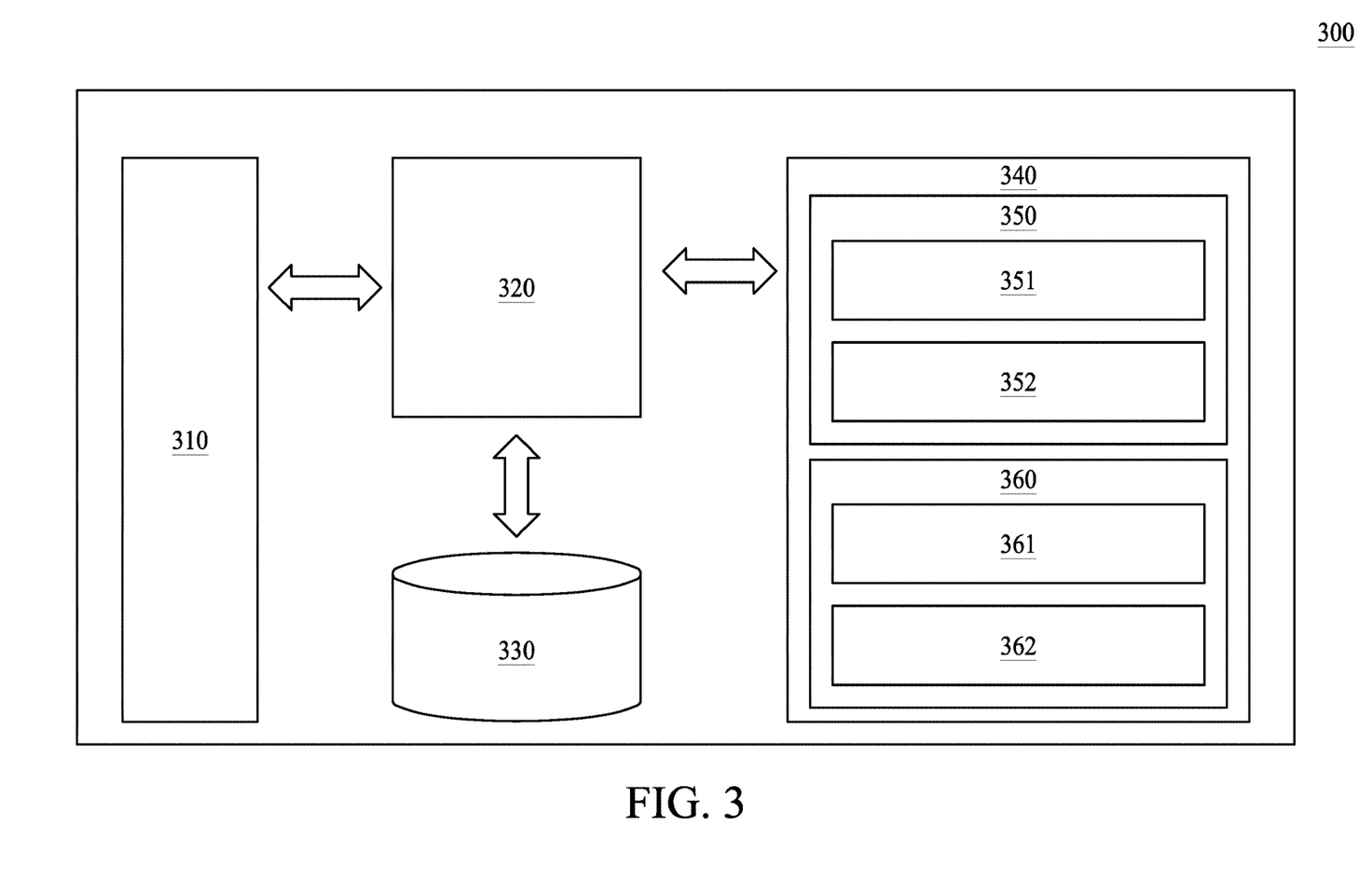
FIG. 3 illustrates a block diagram of a FOTA hardware module in accordance with some embodiments of the present disclosure.

FIG. 3 illustrates a block diagram of a FOTA hardware module 300 in accordance with some embodiments of the present disclosure. In some embodiments, the FOTA hardware module 300 is the same as the FOTA hardware module 230 in FIG. 2. Alternatively, the FOTA hardware module 300 is different from the FOTA hardware module 230 in FIG. 2. The FOTA hardware module 300 includes a hardware interface 310, a processor 320, a first memory 330 (e.g., a flash memory), and a second memory 340 (e.g., a random access memory (RAM)), which are connected through, for example, a bus. The second memory 340 is configured to store a Dispatcher 350, which includes a Link Manager 351 and an Interface Abstraction Layer 352, and a FOTA Core 360, which includes a FOTA Client 361 and an Update Agent 362. The first memory 330 is configured to store at least one executed instance of the Dispatcher 350 and the FOTA Core 360. The Dispatcher 350 and/or the FOTA Core 360 can be temporarily stored in the first memory 330 and executed by the processor 320.

Figure 4:
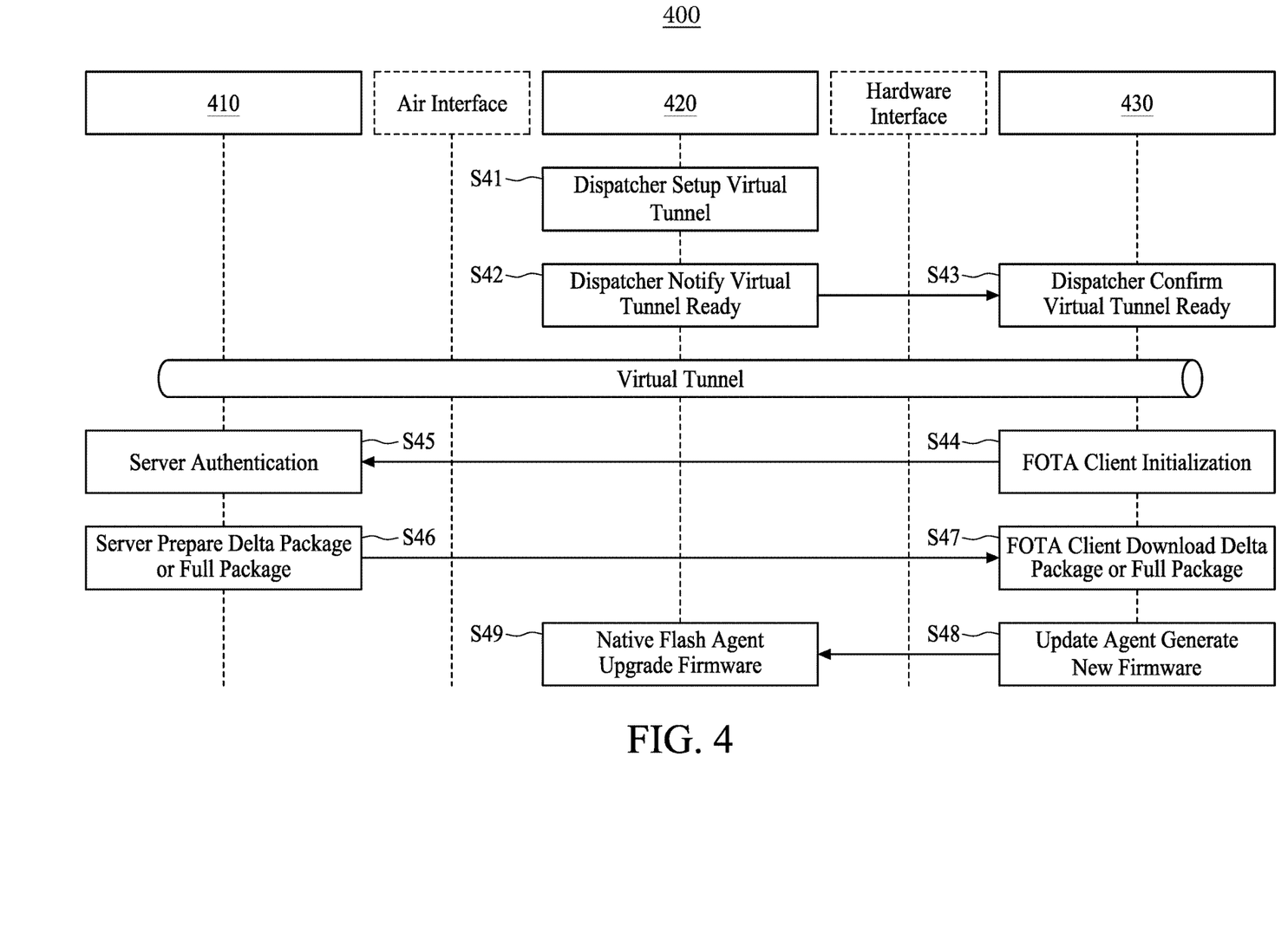
FIG. 4 illustrates a method for operating a FOTA system in accordance with a second aspect of the present disclosure.

FIG. 4 illustrates a method for operating a FOTA system 400 in accordance with some embodiments of the present disclosure. The FOTA system 400 includes a server 410, a target device 420 and a FOTA hardware module 430. In some embodiments, the FOTA system 400 in FIG. 4 is identical to the FOTA system 200 in FIG. 2. For example, the server 410, the target device 420 and the FOTA hardware module 430 are respectively identical to the server 210, the target device 220 and the FOTA hardware module 230 in FIG. 2. FIG. 4 shows processes S41 through S49. Certain components are described with respect to FIG. 4 and may be configured to perform the processes S41 through S49.

Referring to S41, a Dispatcher in the target device 420 initializes set up of a virtual tunnel.

Referring to S42, the Dispatcher in the target device 420 notifies the FOTA hardware module 430 that the virtual tunnel is ready.

Referring to S43, after receiving the notification from the Dispatcher in the target device 420, the Dispatcher in the FOTA hardware module 430 confirms that the virtual tunnel is ready. The virtual tunnel may be established.

Referring to S44, a FOTA Client in the FOTA hardware module 430 initializes a FOTA operation. For example, the FOTA Client in the FOTA hardware module 430 sends a request to the server 410.

Referring to S45, the server 410 authenticates the initialization (e.g., the request) from the FOTA Client in the FOTA hardware module 430.

Referring to S46, after authentication, the server 410 generates, prepares, or retrieves a firmware upgrade package. The firmware upgrade package includes information corresponding to a version of the firmware (e.g. a next version of the firmware or new firmware). In some embodiments, the firmware upgrade package may include a delta package or a full package. For example, the delta package includes information indicating differences between the new firmware and the current version of the firmware (old firmware). In some embodiments, the full package includes information for establishing a new firmware.

Referring to S47, the FOTA Client in the FOTA hardware module 430 receives or downloads the firmware upgrade package from the server 410. In some embodiments, the FOTA Client in the FOTA hardware module 430 verifies the firmware upgrade package. In some embodiments, the firmware upgrade package can be stored in a memory of the target device 420 or the FOTA hardware module 430 (e.g. depending on the remaining storage space of the memories of the target device 420 and the FOTA hardware module 430). For example, if the remaining storage space the memory of the FOTA hardware module 430 is insufficient to store the firmware upgrade package, the firmware upgrade package will be downloaded and stored in the memory of the target device 420. Similarly, if the remaining storage space the memory of the target device 420 is insufficient to store the firmware upgrade package, the firmware upgrade package will be downloaded and stored in the memory of the FOTA hardware module 430.

Referring to S48, an Update Agent in the FOTA hardware module 430 uses the firmware upgrade package and the old firmware (which may be stored in the target device 420) to generate the new firmware and to send the new firmware to the target device 420.

Referring to S49, a Native Flash Agent in the target device 420 upgrades the target device 420 with the new firmware.

In some embodiments, the FOTA Core 255 of the FOTA system 200 in FIG. 2 or the FOTA system 400 in FIG. 4 upgrades a FOTA Client and an Update Agent in the FOTA Core. For example, the upgrade of the FOTA Client and the Update Agent includes specifications of a user, a correction of errors and/or adding a new function. In some embodiments, a version of a protocol (e.g., OMA DM protocol) for communication between the FOTA client and the server can be also upgraded through the virtual tunnel.

In a comparative FOTA system, a FOTA Core is compiled to be compatible with an operating system of a target device. Applications of the FOTA Core are integrated with the target device (via API integration), followed by implementation of a FOTA protocol application, system integration, and integration verification stages. In accordance with the FOTA system 200 in FIG. 2 or the FOTA system in FIG. 4, a FOTA hardware module can provide a standard API, which alleviates a burden on a software developer to adapt the FOTA operation to a target device. Since much of the FOTA operation is performed by the FOTA hardware module, compilation of a FOTA Core can be omitted. Operations of a FOTA protocol application and system integration are integrated in the FOTA hardware module (e.g., in an IC). To integrate FOTA with the target device, a connection is established via a hardware interface between the FOTA hardware module and the target device. After that, the FOTA operation can be performed, and the FOTA hardware module uses the connectivity function of the target device to complete the FOTA operation.

The FOTA hardware module can relieve a software developer of a burden of integrating a FOTA Core into target devices with varying operating systems and varying hardware specifications. Moreover, the FOTA hardware module can offload FOTA operations from target devices, which can be significant for target devices with constrained hardware resources. The FOTA hardware module can use its own hardware resources to support operations of a FOTA Core. Thus, a complex FOTA Core can be executed on the FOTA hardware module, and FOTA upgrading can be realized even for those target devices without desired hardware capacity.

In addition, the FOTA hardware module can be implemented to include a memory having a large capacity (e.g., a large flash memory size) to store a firmware image (e.g., a new firmware). If there is a vital systematic error which occurs in a target device that causes a failure of rebooting or reinitializing of the target device, the firmware image (e.g., the new firmware) stored in the memory of the FOTA hardware module can be used for firmware upgrade and system recovery.

Figure 5:
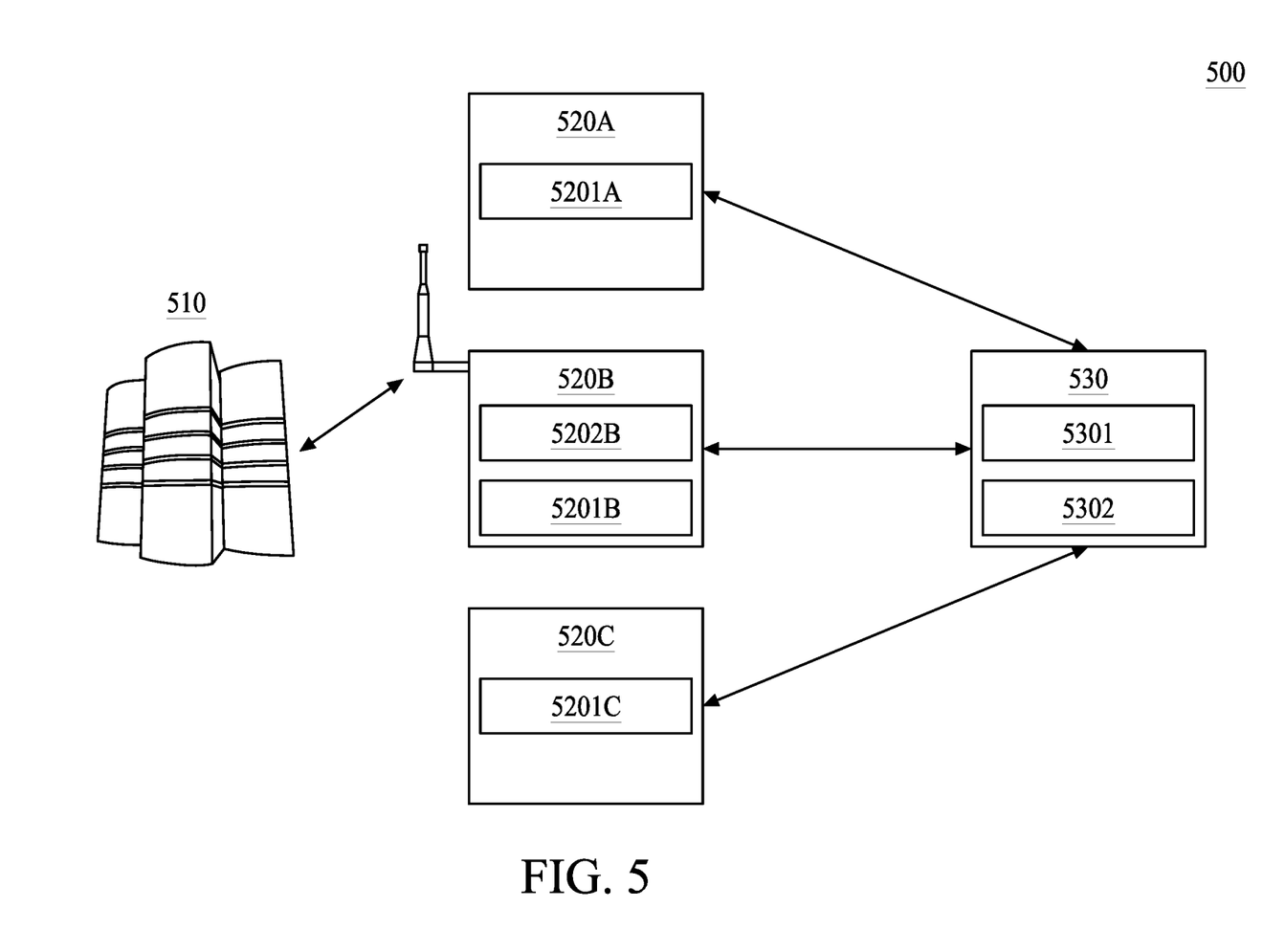
FIG. 5 illustrates a FOTA system in accordance with some embodiments of the present disclosure.

FIG. 5 illustrates a FOTA system 500 to update firmware in multiple target devices 520A, 520B and 520C. The FOTA system 500 includes a server 510 (e.g., a FOTA server), multiple target devices 520A, 520B and 520C and a FOTA hardware module 530. In some embodiments, the FOTA hardware module 530 is the same as the FOTA hardware module 230 in FIG. 2, the FOTA hardware module 300 in FIG. 3 or the FOTA hardware module 430 in FIG. 4.

As shown in FIG. 5, each of the target devices 520A, 520B and 520C respectively includes a Dispatcher 5201A, 5201B and 5201C. The target device 520B includes a wireless communication module 5202B (or a connectivity module), which may be a WiFi module, a 3 G module, a 4 G LTE module, a ZigBee module, a Bluetooth module, or other communication module. The target devices 520A and 520C can omit a wireless communication module. In some embodiments, the wireless communication module 5202B of the target device 520B can be replaced by a wired communication module (e.g., Ethernet or cable).

The FOTA hardware module 530 includes a FOTA core 5301 and a Dispatcher 5302. The FOTA hardware module 530 is connected to the target device 520B by a hardware interface (e.g., USB/UART, I²C, and so forth) and is configured to establish a virtual tunnel between the FOTA hardware module 530 and the server 510 through a communication link between the target device 520B and the server 510 and the communication link between the FOTA hardware module 530 and the target device 520B. After the virtual tunnel is established, the FOTA hardware module 530 is configured to download a firmware upgrade package (e.g., a new firmware) from the server 510 and to store the firmware upgrade package in a memory of the FOTA hardware module 530. The FOTA hardware module 530 is further configured to upgrade an old firmware of the target device 520B using the new firmware. Then the FOTA hardware module 530 is connected to the target device 520A or the target device 520C by a hardware interface (e.g., USB/UART, I²C, and so forth) (and may be disconnected from the target device 520B). Since the new firmware has been stored in the memory of the FOTA hardware module 530, the FOTA hardware module 530 can be configured to upgrade an old firmware of the target device 520A or the target device 520C using the new firmware without connecting the target device 520A or the target device 520C to the server 510. In the embodiments shown in FIG. 5, the FOTA hardware module 530 is used as a gateway or a FOTA module center which is configured to upgrade a plurality of target devices without connecting the target devices to the server using the new firmware stored in the memory of the FOTA hardware module.

Figure 6:
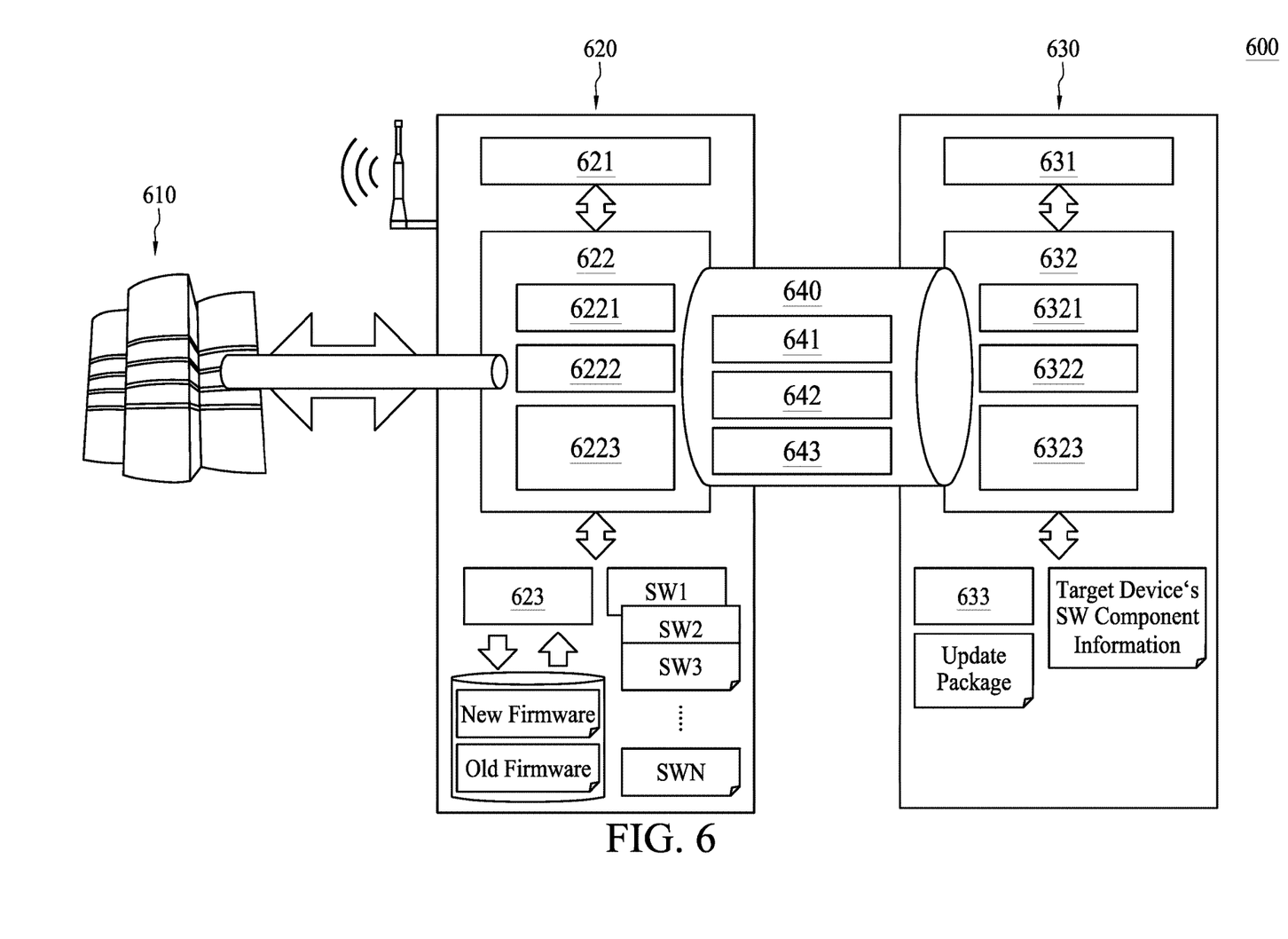
FIG. 6 illustrates a device management (DM) system in accordance with some embodiments of the present disclosure.

FIG. 6 illustrates a device management (DM) system 600 in accordance with some embodiments of the present disclosure. The DM system 600 includes a server 610 (e.g., a DM server), a target device 620 and a DM hardware module 630.

The target device 620 includes a Dispatcher 622 corresponding to a Dispatcher 632 of the DM hardware module 630. The Dispatcher 622 can include a Link Manager 6221, an Executive Agent 6222, and an Interface Abstraction Layer 6223. The target device 620 communicates wirelessly with the server 610 via a transmission network over an air medium. The target device 620 includes a wireless communication module 621 (or a connectivity module), which may be a WiFi module, a 3 G module, a 4 G LTE module, a ZigBee module, a Bluetooth module, or other communication module. In some embodiments, the wireless communication module 621 can be replaced by a wired communication module (e.g., Ethernet or cable). The target device 620 may include a memory (e.g., a flash memory) to store the Dispatcher 622. In some embodiments, the target device 220 may be a smart phone, a tablet PC, an IoT device or other electronic device, and a plurality of software or applications (e.g., SW1, SW2, SW3 . . . SWN) can be installed thereon. In some implementations, the target device 620 can include an Update Agent 623 corresponding to an Update Agent 633 of the DM hardware module 630. The Update Agent 623 can retrieve firmware information (e.g. new firmware information and/or old firmware information) from the memory of the target device 620 to implement update operations.

The DM hardware module 630 includes a DM Core 631, a Dispatcher 632, the Update Agent 633. The Update Agent 633 can retrieve information (e.g. an update package or target device software component information) from the memory of the target device 620 to implement update operations In some embodiments, the DM Core 631 may include a DM Client, a DM firmware update management object (FUMO), a DM SCOMO and/or a DM LAWMO. The Dispatcher 632 includes a Link Manager 6321, an Interpretive Agent 6322 and an Interface Abstraction Layer 6323. In some embodiments, the DM Core 631 and the Dispatcher 632 are stored in a memory (e.g., a flash memory) of the DM hardware module 630.

In some embodiments, the Interpretive Agent 6322 is configured to encode and/or transmit a request for information about the software or applications of the target device 620 to the Executive Agent 6222. In some embodiments, the corresponding information of the software or applications of the target device 620 is a list of the software or applications installed on the target device 620. In some embodiments, the Executive Agent 6222 is configured to retrieve and/or encode information corresponding to the software or applications of the target device 620 and send the encoded information to the Interpretive Agent 6322

In some embodiments, the DM hardware module 630 may be an electronic component (e.g., an integrated circuit (IC)) separated from the target device 620. Alternatively, the DM hardware module 630 may be an electronic component (e.g., an IC) integrated into the target device 620 having access to its own hardware resources separated from hardware resources of the target device 620. The DM hardware module 630 may communicate with the target device 620 by a hardware interface 640 (e.g., USB/UART, I²C, and so forth). This can help to avoid complicated software development and streamlines system integration on the target device 620. Communicated data for a FUMO, SCOMO or LAWMO operation can be transmitted over the hardware interface between the target device 620 and the DM hardware module 630, using paired Dispatchers in the target device 620 and the DM hardware module 630.

A communication link between the server 610 and the DM hardware module 630 includes a virtual tunnel to providing for a FUMO, SCOMO and/or LAWMO operation. For example, the communication link between the server 610 and the DM hardware module 630 is created by using a wireless interface of the connectivity module 621 of the target device 620 and the hardware interface 640 between the target device 620 and the DM hardware module 630. In some embodiments, the virtual tunnel between the target device 620 and the DM hardware module 630 can be readily created (and can include, e.g., a communication protocol 641, a security protocol 642, and an encryption protocol 643). Thus, a DM core in the target device can be omitted. The Dispatcher 622 in the target device 620 and the Dispatcher 632 in the DM hardware module 630 respectively include the Link Managers 6221, 6321 and the Interface Abstraction Layers 6223, 6323. Functions of the Link Managers 6221, 6321 and the Interface Abstraction Layers 6223, 6323 (e.g. for API integration) are further explained below. The DM hardware module 630 uses the virtual tunnel, which leverages the connectivity function of the target device 620 to perform authentication with the server 610 for performing device management (e.g. a FUMO, SCOMO or LAWMO operation). The device management can be performed by using a DM Core 631 in the DM hardware module 630. By utilizing the virtual tunnel, communication between the DM Core 631 and the server 610 can be improved.

The DM hardware module 630 uses the connectivity function of the target device 620 to establish connection and perform authentication with the server 610. The DM hardware module 630 uses the virtual tunnel to establish a connection with the server 610 over a wireless interface and a hardware interface 640, and may thus omit additional connections or additional resources. Once the connection is established, the DM hardware module 630 can perform the device management operation for the target device 620. In some embodiments, communication over the virtual tunnel can be established using one or more of the following: 1) the communication protocol 641 (including, e.g., protocol conversion, packet redirection, and data compression); 2) the security protocol 642 (including, e.g., a handshake protocol, flow control, and a command-line interface); and 3) the encryption/decryption protocol 643 (e.g., Advanced Encryption Standard (AES) encryption/decryption).

The Dispatcher 622 in the target device 620 includes the Link Manager 6221, the Executive Agent 6222 and the Interface Abstraction Layer 6223. The Dispatcher 632 in the DM hardware module 630 includes the Link Manager 6321, the Interpretive Agent 6322 and the Interface Abstraction Layer 6323. The Link Managers 6221, 6321 establish the virtual tunnel therebetween, and also implement the communication protocol 641, the security protocol 642 and the encryption/decryption protocol 643 for data transmission of a FUMO, SCOMO or LAWMO operation. The Link Managers 6221, 6321 also perform communication, negotiation and transformation between different interfaces (e.g., wireless interface and hardware interface within the Interface Abstraction Layer). The Interface Abstraction Layers 6223, 6323 operate to reduce the complexity of communication between varying hardware interfaces and the Link Managers 6221, 6321, and provide a standard API to the Link Managers 6221, 6321.

Figure 7:
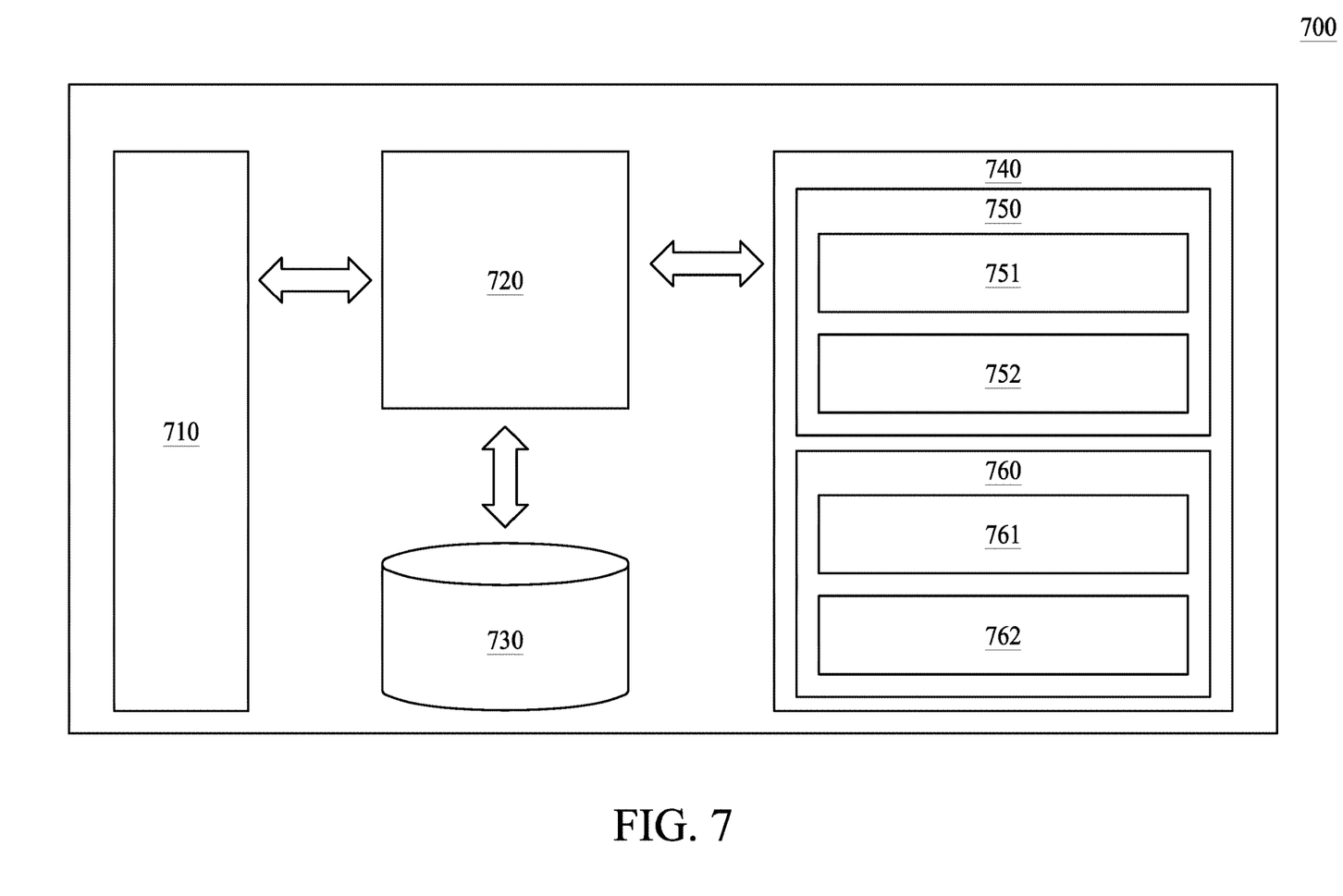
FIG. 7 illustrates a block diagram of a DM hardware module in accordance with some embodiments of the present disclosure.

FIG. 7 illustrates a block diagram of a DM hardware module 700 in accordance with some embodiments of the present disclosure. In some embodiments, the DM hardware module 700 is the same as the DM hardware module 630 in FIG. 6. Alternatively, the DM hardware module 700 is different from the DM hardware module 630 in FIG. 6. The DM hardware module 700 includes a hardware interface 710, a processor 720, a first memory 730 (e.g., a flash memory), and a second memory 740 (e.g., a RAM), which are connected through, for example, a bus. The second memory 740 is configured to store a Dispatcher 750, which includes a Link Manager 751 and an Interface Abstraction Layer 752, and a DM Core 760, which includes a DM Client 761 and a DM FUMO, a DM SCOMO and/or a DM LAWMO 762. In some embodiments, the Dispatcher 750 may further include an Interpretive Agent. The first memory 730 is configured to store at least one executed instance of the Dispatcher 750 and the DM Core 760. The Dispatcher 750 and/or the DM Core 760 can be temporarily stored in the first memory 730 and executed by the processor 720.

Figure 8:
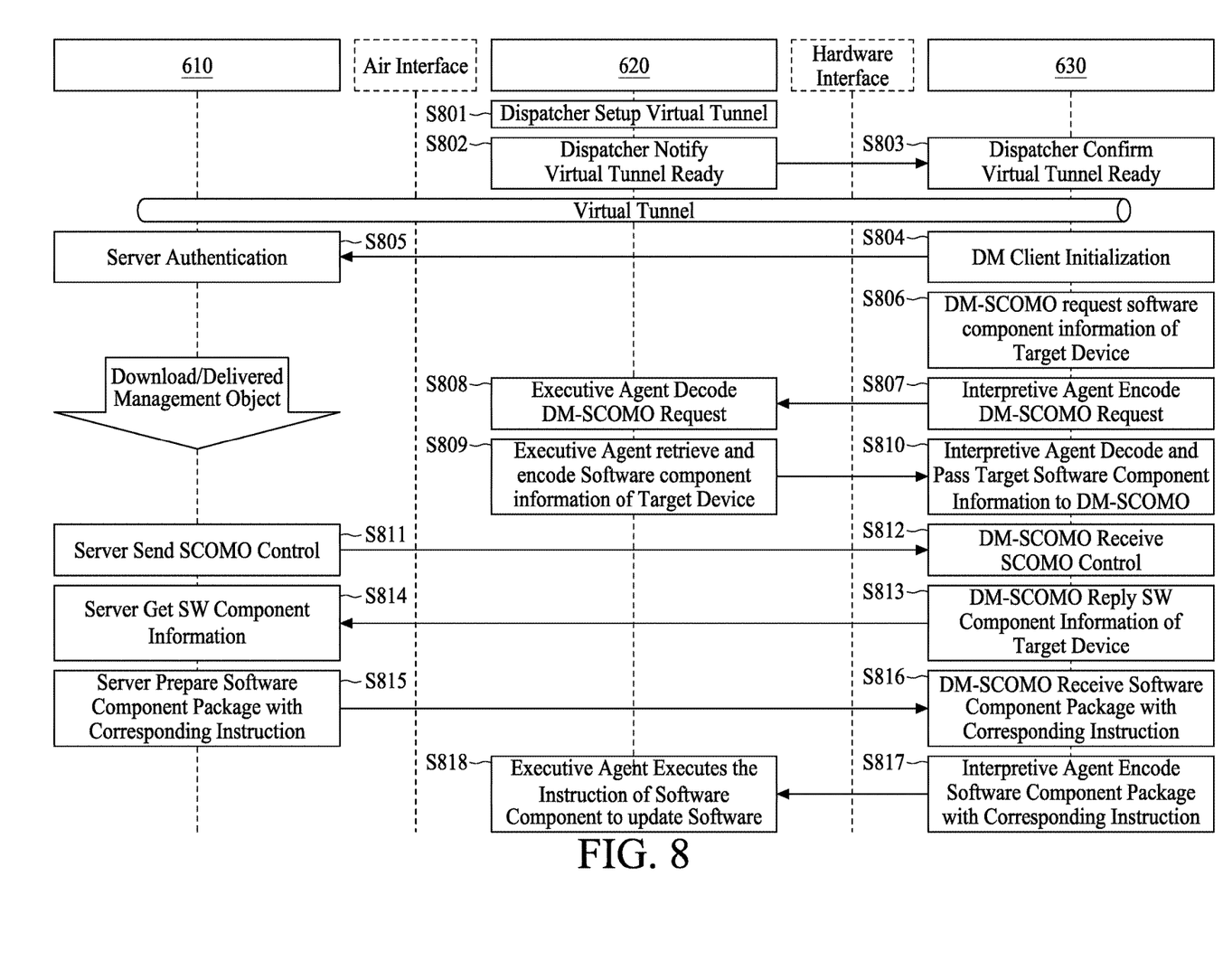
FIG. 8 illustrates a method for operating a DM system in accordance with a second aspect of the present disclosure.

FIG. 8 illustrates a method for operating the DM system 600 as shown in FIG. 6 in accordance with some embodiments of the present disclosure. FIG. 8 shows processes S801 through S818. Certain components are described with respect to FIG. 8 and may be configured to perform the processes S801 through S818.

Referring to S801, a Dispatcher 622 in the target device 620 sets up a virtual tunnel.

Referring to S802, the Dispatcher 622 in the target device 620 notifies the DM hardware module 630 that the virtual tunnel is ready.

Referring to S803, after receiving the notification from the Dispatcher 622 in the target device 620, the Dispatcher 632 in the DM hardware module 630 confirms that the virtual tunnel is ready.

Referring to S804, the DM Client in the DM Core 631 of the DM hardware module 630 initializes a SCOMO operation. For example, the DM Client in the DM Core 631 of the DM hardware module 630 sends a request to the server 610.

Referring to S805, the server 610 authenticates the initialization (e.g., the request) from the DM Client in the DM Core 631 of the DM hardware module 630.

Referring to S806, the DM SCOMO in the DM Core 631 of the DM hardware module 630 is sends a request for corresponding information of the software or applications of the target device 620 to the Interpretive Agent 6322. In some embodiments, the corresponding information of the software or applications of the target device 620 is a list of the software or applications installed on the target device 620. In some embodiments, the request can be sent automatically at a predetermined time. In some embodiments, the request can be sent when the DM hardware module 630 is connected to the target device 620. In some embodiments, the request can be sent based on input from a user.

Referring to S807, the Interpretive Agent 6322 in the Dispatcher 632 of the DM hardware module 630 encodes the request received from the DM SCOMO in the DM Core 631 of the DM hardware module 630 and sends the encoded request to the Executive Agent 6222 in the Dispatcher 622 of the target device 620.

Referring to S808, the Executive Agent 6222 in the Dispatcher 622 of the target device 620 decodes the encoded request received from the Interpretive Agent 6322 in the Dispatcher 632 of the DM hardware module 630.

Referring to S809, the Executive Agent 6222 in the Dispatcher 622 of the target device 620 retrieves and encodes information corresponding to the software or applications of the target device 620 and sends the encoded information to the Interpretive Agent 6322 in the Dispatcher 632 of the DM hardware module 630.

Referring to S810, the Interpretive Agent 6322 in the Dispatcher 632 of the DM hardware module 630 decodes the encoded information and sends the information corresponding to the software or applications of the target device 620 to the DM SCOMO in the DM Core 631 of the DM hardware module 630.

Referring to S811, the server 610 sends a SCOMO control to the DM hardware module 630 through the virtual tunnel.

Referring to S812, the DM SCOMO in the DM Core 631 of the DM hardware module 630 receives the SCOMO control from the server 610.

Referring to S813, the DM SCOMO in the DM Core 631 of the DM hardware module 630 replies to the SCOMO control and transmits the information corresponding to the software or applications of the target device 620 to the server 610.

Referring to S814, the server 610 receives the reply including the information corresponding to the software or applications of the target device 620 from the DM SCOMO in the DM Core 631 of the DM hardware module 630.

Referring to S815, the server 610 generates, prepares or retrieves a software (or application) component package based on to the reply from the DM SCOMO in the DM Core 631 of the DM hardware module 630 and to send the software (or application) component package to the DM hardware module 630.

Referring to S816, the DM SCOMO in the DM Core 631 of the DM hardware module 630 receives the software (or application) component package from the server 610.

Referring to S817, the Interpretive Agent 6322 in the Dispatcher 632 of the DM hardware module 630 encodes the software (or application) component package and sends the encoded software (or application) component package to the target device 620.

Referring to S818, the Executive Agent 6222 in the Dispatcher 622 of the target device 620 decodes the encoded software (or application) component package and updates the software or applications of the target device 620.

In some embodiments, S811 and S812 can be omitted depending on design specifications. In some embodiments, S806, S807, S808, S809 and S810 can be performed after S813 depending on design specifications.

Figure 9:
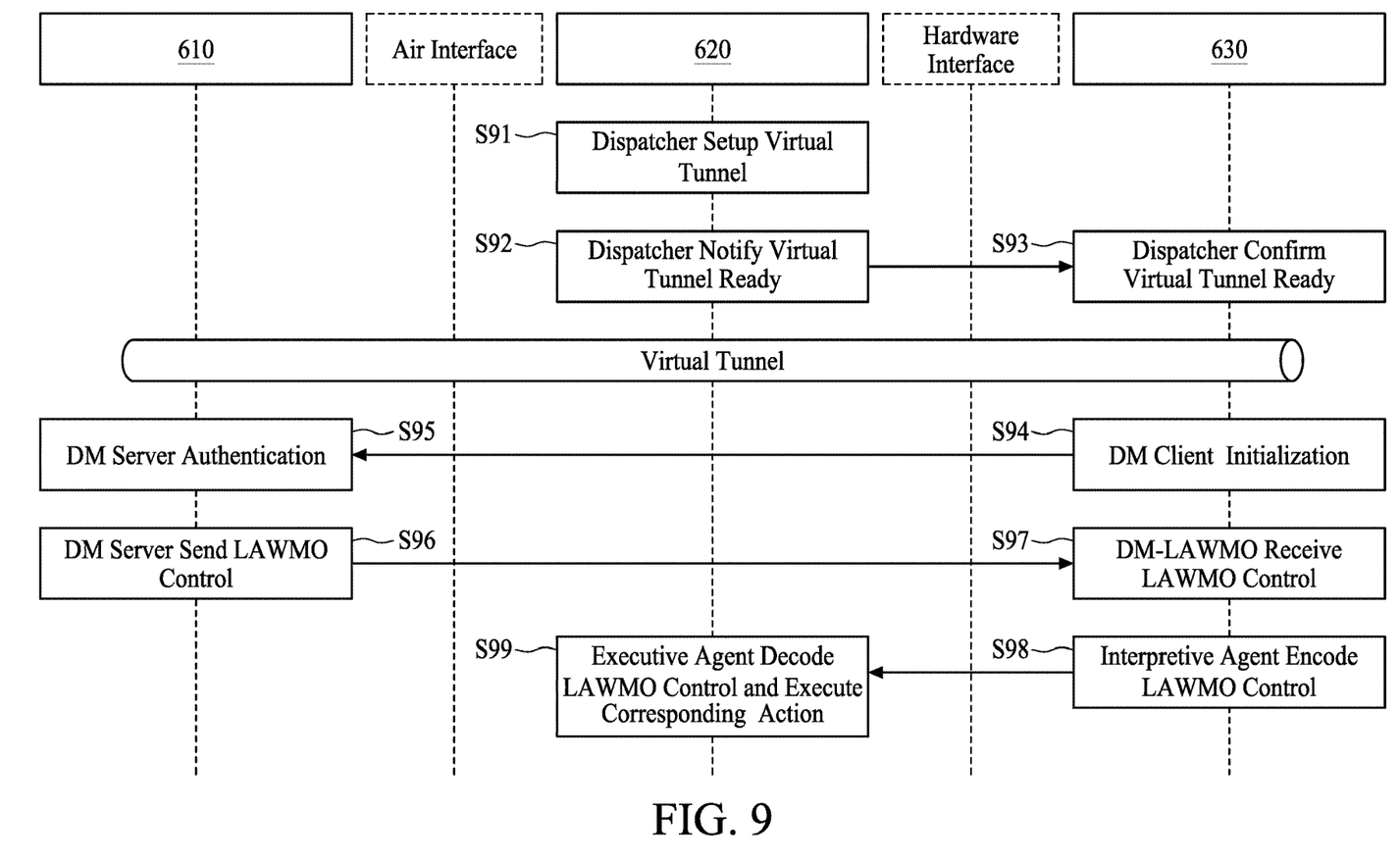
FIG. 9 illustrates a method for operating a DM system in accordance with a second aspect of the present disclosure.

FIG. 9 illustrates a method for operating the DM system 600 as shown in FIG. 6 in accordance with some embodiments of the present disclosure. FIG. 9 shows processes S91 through S99. Certain components are described with respect to FIG. 9 and may be configured to perform the processes S91 through S99.

Referring to S91, a Dispatcher 622 in the target device 620 sets up a virtual tunnel.

Referring to S92, the Dispatcher 622 in the target device 620 notifies the DM hardware module 630 that the virtual tunnel is ready.

Referring to S93, after receiving the notification from the Dispatcher 622 in the target device 620, the Dispatcher 632 in the DM hardware module 630 confirms that the virtual tunnel is ready.

Referring to S94, the DM Client in the DM Core 631 of the DM hardware module 630 initializes a LAWMO operation. For example, the DM Client in the DM Core 631 of the DM hardware module 630 sends a request to the server 610.

Referring to S95, the server 610 authenticates the initialization (e.g., the request) from the DM Client in the DM Core 631 of the DM hardware module 630.

Referring to S96, the server 610 sends a LAWMO control to the DM hardware module 630 through the virtual tunnel.

Referring to S97, the DM LAWMO in the DM Core 631 of the DM hardware module 630 receives the LAWMO control from the server 610.

Referring to S98, the Interpretive Agent 6322 in the Dispatcher 632 of the DM hardware module 630 encodes the LAWMO control and sends the encoded LAWMO control to the target device 620.

Referring to S99, the Executive Agent 6222 in the Dispatcher 622 of the target device 620 decodes the encoded LAWMO control and performs the corresponding action (e.g., the LAWMO operation).

In a comparative DM system, a DM Core is compiled to be compatible with an operating system of a target device. Applications of the DM Core are integrated with the target device (via API integration), followed by DM protocol application, system integration, and integration verification stages. In accordance with the DM system 600 in FIG. 6, the DM hardware module 630 can provide a standard API, which alleviates a burden on a software developer to adapt the SCOMO or LAWMO operation to a target device. Since much of the SCOMO or LAWMO operation is performed in the DM hardware module 630, compilation of a DM Core can be omitted. Operations of DM protocol application and system integration are integrated in the DM hardware module (e.g., an IC). To integrate DM into the target device, a connection is established via a hardware interface between the DM hardware module and the target device. After that, the SCOMO or LAWMO operation can be performed, and the DM hardware module uses the connectivity function of the target device to complete the SCOMO or LAWMO operation.

The DM hardware module can relieve a software developer of a burden of integrating a DM Core into target devices with varying operating systems and varying hardware specifications. Moreover, the DM hardware module can offload SCOMO or LAWMO operations from target devices, which can be significant for target devices with constrained hardware resources. The DM hardware module can use its own hardware resources to support operations of a DM Core. Thus, a complicated DM Core can be executed on the DM hardware module, and the SCOMO or LAWMO operation can be realized even for those target devices without requisite hardware capacity. In addition, the DM hardware module can be implemented to include a memory having a greater capacity (e.g., flash memory size) to store an entire firmware image (e.g., a new firmware). If there is a vital systematic error which occurs in a target device that causes a failure of rebooting or reinitializing of the target device, the firmware image (e.g., the new firmware) stored in the memory of the DM hardware module can be used for software updating.

As used herein, the singular terms "a," "an," and "the" may include a plurality of referents unless the context clearly dictates otherwise.

Some embodiments of this disclosure relate to a non-transitory computer-readable storage medium having computer code or instructions thereon for performing various computer-implemented operations. The term "computer-readable storage medium" is used to include any medium that is capable of storing or encoding a sequence of instructions or computer code for performing the operations, methodologies, and techniques described herein. The media and computer code may be those specially designed and constructed for the purposes of the embodiments of the disclosure, or they may be of the kind available to those having skill in the computer software arts. Examples of computer-readable storage media include volatile and non-volatile memory for storing information. Examples of memory include semiconductor memory devices such as erasable programmable read-only memory (EPROM), electrically erasable programmable read-only memory (EEPROM), random-access memory (RAM), and flash memory devices, discs such as hard drives, removable hard drives, magneto-optical, compact disc (CD), digital versatile disc (DVD), and Blu-ray discs, memory sticks, and the like.

Examples of computer code include machine code, such as produced by a compiler, and files containing higher-level code that are executed by a processor using an interpreter or a compiler. For example, an embodiment of the disclosure may be implemented using Java, C++, C or other object-oriented structure programming language and development tools. Additional examples of computer code include encrypted code and compressed code. Moreover, an embodiment of the disclosure may be downloaded as a computer program product, which may be transferred from a remote device (e.g., a server) to a requesting device (e.g., a client). Another embodiment of the disclosure may be implemented in hardwired circuitry in place of, or in combination with, processor-executable software instructions.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An electronic device for updating firmware in a target device over-the-air, the electronic device comprising:
    a processor;
    a memory;
    a dispatching module configured to establish a communication link between the electronic device and the target device by:
    receiving a signal from the target device;
    and establishing the communication link between the electronic device and the target device in response to the signal wherein the communication link is a virtual tunnel; and
    a firmware over-the-air (FOTA) core configured to receive information corresponding to updated firmware via the established communication link, wherein the FOTA core is connected with the target device through a hardware interface and wherein the FOTA core uses the established communication link to establish a connection with a server, wherein the FOTA core is further configured to send a request to the server and to receive information corresponding to current firmware of the target device from the server subsequent to an identification of the target device.

2. The electronic device of claim 1, wherein the dispatching module is further configured to:
    identify the target device; and
    establish the communication link between the electronic device and the target device subsequent to the identification of the target device.

3. The electronic device of claim 1, wherein the information corresponding to the updated firmware further includes a firmware upgrade package.

4. The electronic device of claim 1, further comprising an update module configured to generate the updated firmware based on the information corresponding to the updated firmware.

5. The electronic device of claim 4, wherein the update module is further configured to send the updated firmware to the target device.

6. A FOTA system comprising:
    a processor; a memory;
    a first dispatching module configured to establish a communication link between the first dispatching module and a server; and a FOTA module comprising:
    a second dispatching module configured to establish a communication link between the first dispatching module and the second dispatching module by:
    receiving a signal from the first dispatching module; and
    establishing the communication link between the first dispatching module and the second dispatching module in response to the signal wherein the communication link is a virtual tunnel; and
    a FOTA core configured to receive information corresponding to firmware via the established communication link between the first dispatching module and the second dispatching module, wherein the FOTA module is connected with the first dispatching module through a hardware interface and wherein the FOTA core uses the established communication link to establish a connection with the server, wherein the FOTA core is further configured to send a request to the server and to receive the information corresponding to the firmware from the server subsequent to an identification of the FOTA system.

7. The FOTA system of claim 6, wherein
    the first dispatching module has access to a public key and the second dispatching module has access to a private key; and
    the communication link between the first dispatching module and the second dispatching module is established responsive to matching the public key and the private key.

8. The FOTA system of claim 6, wherein the information corresponding to the firmware further includes a firmware upgrade package.

9. The FOTA system of claim 6, wherein the FOTA module further comprises an update module configured to generate the firmware based on the information corresponding to the firmware and send the firmware to the first dispatching module.

10. The FOTA system of claim 6, wherein the first dispatching module is connected with the server through a wireless interface.

11. A method for updating FOTA, the method comprising:
    (a) identifying a device;
    (b) establishing a communication link between a FOTA module and the device, wherein the communication link between the FOTA module and the device is established subsequent to the identification of the device, wherein the communication link is a virtual tunnel;
    (b) connecting the FOTA module with the device through a hardware interface;

(d) sending a request to a server; and (e) receiving, by the FOTA module, information corresponding to firmware by the established communication link from the server, wherein the information corresponding to the firmware further includes a delta package, wherein the FOTA module is connected with the device through a hardware interface and wherein the FOTA module uses the established communication link to establish a connection with a server.

12. The method of claim 11, further comprising:

generating, by the FOTA module, the firmware based on the information corresponding to the firmware; and sending the firmware to the device.

13. An electronic device for updating firmware in a target device over-the-air, the electronic device comprising:

a processor;

a memory;

a dispatching module configured to establish a communication link between the electronic device and the target device by:

receiving a signal from the target device; and establishing the communication link between the electronic device and the target device in response to the signal, wherein the communication link is a virtual tunnel; and a firmware over-the-air (FOTA) core configured to receive firmware upgrade package corresponding to updated firmware via the established communication link, wherein the FOTA core is connected with the target device through a hardware interface, wherein the FOTA Core further comprises:

an Update Agent configured to use the firmware upgrade package and a current firmware stored in the target device to generate a new firmware and send the new firmware to the target device.

\* \* \* \* \*